May 4, 1937.  E. B. MIDDLETON ET AL  2,079,376

PHOTOGRAPHIC SENSITIZER

Filed March 25, 1932

SENSITIVITY RANGE

4:5:4':5'-TETRAPHENYL-3:3'-DIETHYL THIAZOLO CARBO CYANINE IODIDE  (FROM BASE 1)

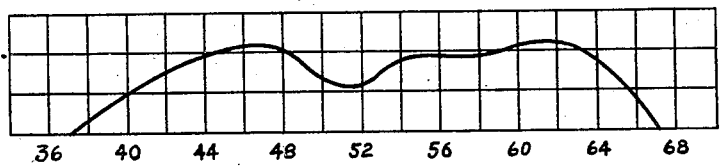

Fig.1.

4:4'-DIPHENYL-3:3'-DIETHYL THIAZOLO CARBO CYANINE IODIDE  (FROM BASE 2)

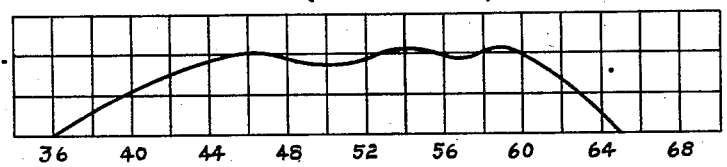

Fig.2.

4-PHENYL-5 METHYL-3:1'-DIETHYL THIAZOLO-ψ-CYANINE IODIDE  (FROM BASE 4)

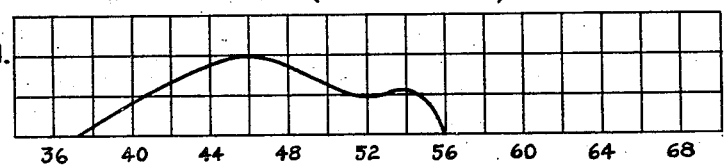

Fig.3.

DENSITY

4-PHENYL-3:1'-DIETHYL-THIAZOLO-ψ-CYANINE IODIDE  (FROM BASE 2)

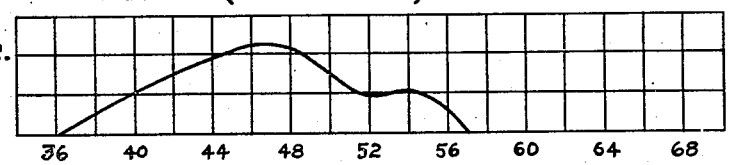

Fig.4.

4-PHENYL-5-METHYL-3:1'-DIETHYL THIAZOLO-ISOCYANINE-IODIDE  (FROM BASE 4)

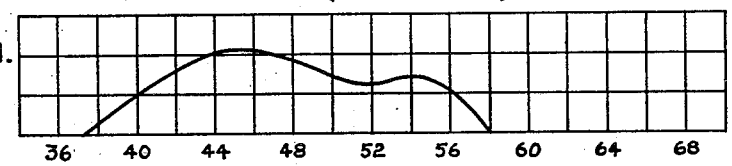

Fig.5.

INVENTORS
Edmund B. Middleton
George A. Dawson

BY  R. L. Johnston

ATTORNEY

Patented May 4, 1937

2,079,376

UNITED STATES PATENT OFFICE 2,079,376

PHOTOGRAPHIC SENSITIZER

Edmund B. Middleton, New Brunswick, and George A. Dawson, North Brunswick Township, Middlesex County, N. J., assignors to Du Pont Film Manufacturing Corporation, New York, N. Y., a corporation of Delaware Application March 25, 1932, Serial No. 601,290

4 Claims. (Cl. 95—7)

Our present invention relates to photography and more particularly to improved photographic sensitizers.

One object of this invention is to provide improved and selective color sensitization of photographic emulsions by means of a type of novel cyanine dyes made from certain thiazoles. Another object is to extend with relative uniformity the sensitivity of the emulsion to light in a wide range of the longer wave lengths, especially to those wave lengths in the vicinity of the red and green regions of the spectrum. Other objects will plainly appear from the detailed description presented herein.

To enable those skilled in the art to use our invention, we will as an illustration describe its preferred embodiment with the understanding that modifications may be presented without departing from its broader spirit and scope.

To efficiently intensify the speed and color sensitivity of an emulsion to light in the above described portions of the spectrum, we have discovered a type of novel cyanine dyes derived from certain thiazole bases represented diagrammatically by the following general formula

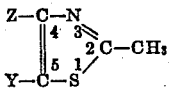

wherein Z and Y are used to designate substituents.

The sensitivity curves of emulsions containing certain of the dyes herein described are illustrated by the accompanying drawing.

Preferred thiazole bases from which our novel type of cyanine dyes is derived, are those bases obtained by varying the groups in the four and five positions of the aforementioned general formula. We are thereby afforded bases represented by the following formulae:

I
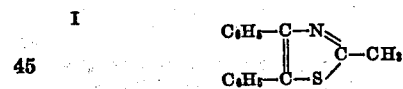

II
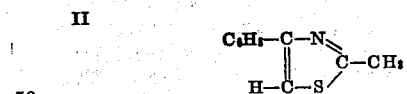

III
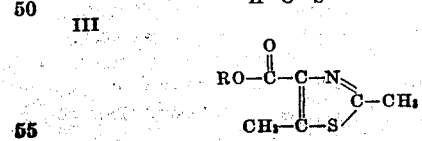

wherein R represents any alkyl group, or substituted alkyl group.

IV
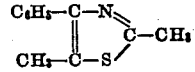

Such preferred methyl thiazole bases as designated above are all preferably made by condensing halogen substituted aldehydes, ketones, or halogen substituted ketonic esters with thioamides. For examples, the thiazole in Formula I (2-methyl, -4,-5 diphenyl thiazole) may be made by condensing C₆H₅—CHBr—C—C₆H₅ with thioacetamide. These bases are well known and have been described in the prior art, particularly by Hubacher in Annalen, No. 259, page 244, and by Hantzch in Annalen, No. 250, page 269.

As will be further shown, our dyes are derived as a result of substituting a methyl group in the two position of the aforementioned general formula, in addition to varying therein the groups in the four and five positions.

In general we prefer to make our novel dyes by first converting the above mentioned methyl thiazole bases to quaternary compounds, preferably by heating them with ethyl iodide or ethyl p-toluene-sulphonate. These quaternary compounds may then be converted to novel cyanine dyes which will be grouped and described in the three following correlated examples: (A) Thiocarbocyanines, (B) Pseudocyanines, (C) Dyes related to isocyanines.

To further explain our invention we will describe various preferred illustrations in each of the aforementioned examples of dyes made from our herein described thiazole bases, first using base I (diphenyl-methyl-thiazole), although the related bases II, III, or IV, may be used whenever desired.

In the following formulae for our novel cyanine dyes given under Examples A, B, and C, we use R to represent any alkyl or substituted alkyl group and X to represent a suitable acid radicle such as the iodide radicle or the para-toluene-sulphonate radicle.

Example A. Thiocarbocyanines

One of the preferred thiocarbocyanines is derived from Base I in the following manner: The ethiodide of 2-methyl, 4,-5 diphenyl thiazole is preferably heated in pyridine solution with a small amount of ethyl orthoformate. The dye forms and on cooling it precipitates. It is then filtered and is recrystallized from alcohol. It is then dissolved in alcohol, and a small amount added to a photographic emulsion, preferably at some time before the emulsion with a greatly increased sensitivity reaching a maximum at 615 to 620μ. More specifically, one of the preferred thiocarbocyanines is derived from Base I in the following manner: Two grams of the ethiodide of 2-methyl, 4,-5 diphenyl thiazole (or an equivalent amount of some other quaternary salt such as 2.2 grams of the p-toluene sulphonate) and 4 grams of ethyl orthoformate and 15 grams of dry pyridine, in a dry flask with a reflux condenser attached, are heated to boiling. The mixture is allowed to reflux for one hour. A blue dye gradually forms. The flask is allowed to stand overnight in a cool place, and the precipitated dye is filtered and washed with ether. It is then recrystallized from alcohol. This dye, added to the emulsion, confers an extra sensitivity to it, with a maximum between 615 and 620μ, and extending to 670. As regards methods of adding the dye to the emulsion, it can be added at several points during manufacture. The following example will illustrate one method of sensitizing: one-tenth of a gram of dye is dissolved in 100 cc. of alcohol and this solution is added slowly, with stirring, to the melted emulsion. This is then coated as usual. This dye is represented by the following formula:

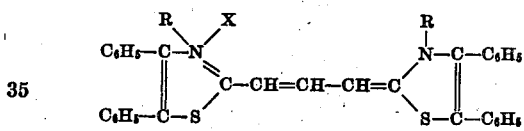

Other novel thiocarbocyanine dyes may be derived from thiazole Base Number II. One of such dyes is the ethiodide, and is represented by the following formula:

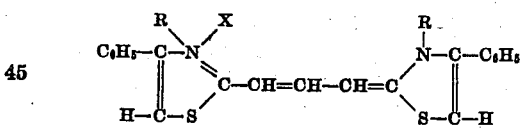

This dye may be made exactly like the dye described in Example A except that instead of 2 grams of the ethiodide of Base I, one uses 1.6 grams of the ethiodide of Base II. The resulting dye confers an extra sensitivity to the emulsion when added to it as described in Example A, except that the sensitivity has a maximum at approximately 590 and extends to 650μ.

In a like manner, by employing the herein described thiazole Base III, we derive additional and novel thiocarbocyanine dyes, among which is the dye represented by the following formula:

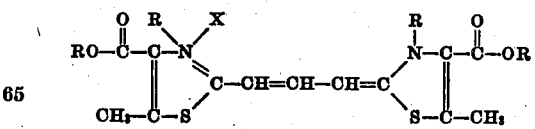

For example, if, in Example A, one uses instead of 2 grams of the ethiodide of Base I, an equivalent amount of the ethiodide of Base III, one obtains a blue dye which confers a moderate extra sensitivity to the emulsion, with maximum at approximately 580 and extends to 630μ.

An additional and novel thiocarbocyanine dye may be derived in a like manner from Base IV in the following manner: The ethiodide of 2-methyl 4 phenyl 5 methyl, thiazole is added in pyridine solution with a small amount of ethyl orthoformate. The dye forms and on cooling and diluting with ether it precipitates. It is purified by recrystallization from alcohol. It is then dissolved in alcohol and a small amount of the dye is added to a photographic emulsion, preferably at some time before the emulsion is coated on its support. This will provide the emulsion with a greatly increased sensitivity reaching a maximum at 600μ. This dye is represented by the following formula:

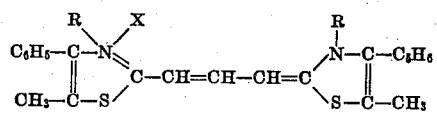

For example, in Example A, if one uses instead of the ethiodide of Base I, an equivalent amount of the ethiodide of Base IV, one obtains a blue dye which confers an extra sensitivity to a photographic gelatino-silver halide emulsion, with maximum at approximately 595 and extending to 620μ.

The foregoing dyes may be prepared from the corresponding 2-methyl-thiazole bases as given on page 2, by the general method of F. M. Hamer, J. C. S. 1927, pages 2796–2809. This method involves boiling approximately 2 moles of the 2-methyl-thiazole alkyl-iodide (e. g., the ethiodide of Bases I, II, III or IV) with approximately 4 moles of ethyl orthoformate in pyridine for an hour. The amount of pyridine used is usually sufficient to dissolve the base and may be variable. The amount of ethyl orthoformate is normally in excess of the theoretical requirements of one mole per two moles of quaternary ammonium salt. The time of boiling may also be varied, as will be apparent to one skilled in the art.

For instance, we have prepared the dye from 2-methyl-4-phenyl-5-methyl thiazole by boiling 2 grams (approximately 2 moles) of the ethiodide of 2-methyl-4-phenyl-5-methyl thiazole in 40 cc. of pyridine and 2 cc. of ethyl orthoformate (approximately 4 moles) for one hour. A purple carbocyanine dye was formed, separated and recrystallized from alcohol. Similarly, this dye was prepared by boiling 2 grams of the ethiodide of 2-methyl-4-phenyl-5-methyl thiazole in 40 cc. of dry pyridine under a reflux condenser with 2 cc. of ethyl orthoformate for three hours, followed by separation and recrystallization from alcohol, indicating that the time of boiling, as would be expected by one skilled in the art, is not critical.

The other dyes described were all prepared in a similar manner.

Example B. Pseudocyanines

One of our preferred pseudocyanines is derived from Base I in the following manner: The ethiodide of 2-methyl 4,-5 diphenyl thiazole and alphaiodoquinoline ethiodide are suspended in absolute alcohol and treated with alkali. The resulting red dye is purified by recrystallization from alcohol. This dye when added to the emulsion, will provide the emulsion with a greatly increased sensitivity reaching a maximum at 540μ. More specifically, this preparation may be described as follows: Two grams of the ethiodide of 2-methyl 4,-5 diphenyl thiazole and 2 grams of alphaiodiquinoline ethiodide are suspended in 50 cc. of boiling absolute alcohol and treated with .55 gram of potassium hydroxide dissolved in absolute alcohol. Boiling is continued for fifteen minutes, and a red dye gradually forms. On cooling, it crystallizes. It may be recrystallized from alcohol. This dye is represented by the following formula:

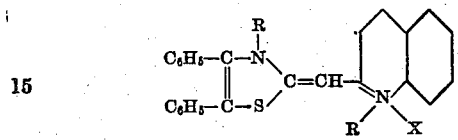

Another novel pseudocyanine dye that efficiently acts to definitely shift the maximum of extra sensitivity towards the red, is derived from Base I by using alphaiodo-naphthoquinoline ethiodide instead of the alphaiodoquinoline ethiodide described above. This dye is represented by the following formula:

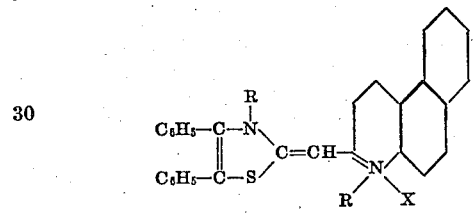

A general method for preparing the dyes of Example B is described by F. M. Hamer, "The $\psi$-cyanine Condensation", J. C. S. 1928, pages 206–215. This method involves heating the quaternary ammonium salt of the thiazole base with approximately equi-molecular proportions of an alpha-halogen substituted quinoline in absolute alcohol and treating with an alkali. Thus, according to this method, thiopseudocyanines may be prepared from the ethiodides of Bases I, II, III, and IV by heating together approximately equi-molecular proportions of alpha-iodo-quinoline ethiodide and the corresponding ethiodide of the thiazole base, for instance, 2-methyl-4: 5-diphenyl thiazole ethiodide. The mixture is heated to the boiling point in a suitable amount of absolute alcohol, for instance 100 cc., and then treated with about 0.7 gram of potassium hydroxide dissolved in 10 cc. of absolute alcohol, and boiled under a reflux condenser for thirty minutes. Thereafter, the solution is allowed to cool and the crystals of the thiopseudocyanine separated and recrystallized from alcohol. Similarly, the thiopseudocyanines may be prepared from the ethiodides of the other bases described. Instead of alpha-iodo-quinoline ethiodide, the corresponding proportions of alpha-iodo-naphtho-quinoline ethiodide may be used.

*Example C. Dyes related to isocyanines*

One of our preferred dyes under this heading is derived from Base I in the following manner: The ethiodide of 2-methyl, 4,-5 diphenyl thiazole and quinoline ethiodide are dissolved in alcohol and treated with alkali. The resulting red dye is purified by recrystallization. When added to a photographic emulsion, this dye uniformly extends the normal sensitivity of the emulsion far into the green region of the spectrum. More specifically, this procedure may be described as follows: Two grams of the ethiodide of 2-methyl, 4,-5 diphenyl thiazole and 1.4 grams of quinoline ethiodide are dissolved in 50 cc. of boiling alcohol and treated with .28 gram of potassium hydroxide dissolved in alcohol. The mixture is maintained at the boiling point for fifteen minutes, and a red dye is formed. It may be purified by re-crystallization from alcohol. This dye is represented by the following formula:

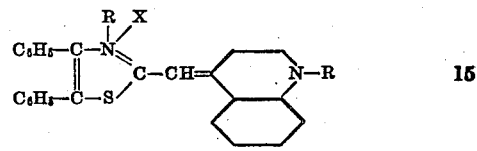

The dyes related to the isocyanines may be prepared by the usual method for preparing isocyanines as given, for example, in Jour. Ind. & Eng. Chem., vol. 11, No. 5, page 460. This method involves, in general, dissolving the quaternary base of the 2-methyl-thiazole derivative and a quinoline-alkyl-iodide quaternary ammonium salt in alcohol, heating the solution to boiling and adding alcoholic potassium hydroxide. The boiling is continued for a short time after the addition of the potassium hydroxide, after which the solution is allowed to cool and the crystals of the dye separated. The proportions of materials, time of heating, etc., may be substantially the same as for the preparation of the isocyanines in the literature article referred to. Thus, one molecular equivalent of the ethiodide of 2-methyl-4: 5-diphenyl-thiazole may be reacted with the quinoline ethiodide employing substantially the same proportions of alcohol and alcoholic potassium hydroxide given in the said literature article. The time of heating, degree of heating and the method of separation may also be substantially the same.

We have found that our invention has provided a type of novel cyanine dyes that has enabled us to obtain greatly improved color balance in the ultimate image, by the incorporation of one or more of our dyes in a photographic emulsion. These dyes act with marked efficiency to uniformly and selectively extend the sensitivity of prior panchromatic emulsions to light in a wide range of the longer wave lengths, especially in the vicinity of the red and green regions of the spectrum, without conferring any abrupt or over-emphasized increase of the sensitivity in any relatively restricted region of the spectrum that would tend to distort or destroy the desired color balance in the final photographic image.

Numerous dyes that are the allied or related equivalents of those disclosed herein may be used without departing from our invention and it is clearly contemplated that such equivalents, or modifications thereof, as well as the use of such dyes as sensitizers for photographic emulsions, fall within the intent and scope of the appended claims.

So much of this application as relates broadly to photographic emulsions containing cyanine dyes derived from 2-methyl-thiazole and related bases having monovalent substituents in the 4- and/or 5- positions, and so much as relates specifically to pseudocyanine dyes and dyes related to isocyanines is described and claimed in our co-pending application U. S. Serial No. 30,928 filed July 11, 1935.

What we claim as our invention and desire to be secured by Letters Patent of the United States is:

1. A gelatino-silver-halide photographic emulsion containing a symmetrical dye of the thiocarbocyanine type, said dye corresponding to the formula

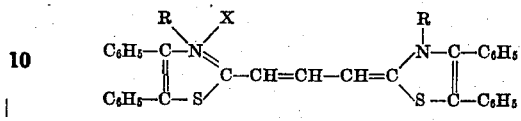

wherein R represents an alkyl group and X an acid radicle.

2. A gelatino-silver halide photographic emulsion containing a dye having the following formula

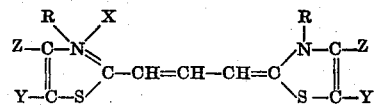

wherein X represents the negative radical of an acid, R represents alkyl, and Y and Z represent aryl radicals of the benzene series.

3. Photographic elements containing a photographic emulsion as claimed in claim 2.

4. Photographic elements containing a photographic emulsion as claimed in claim 1.

EDMUND B. MIDDLETON.
G. A. DAWSON.